Figure 1:
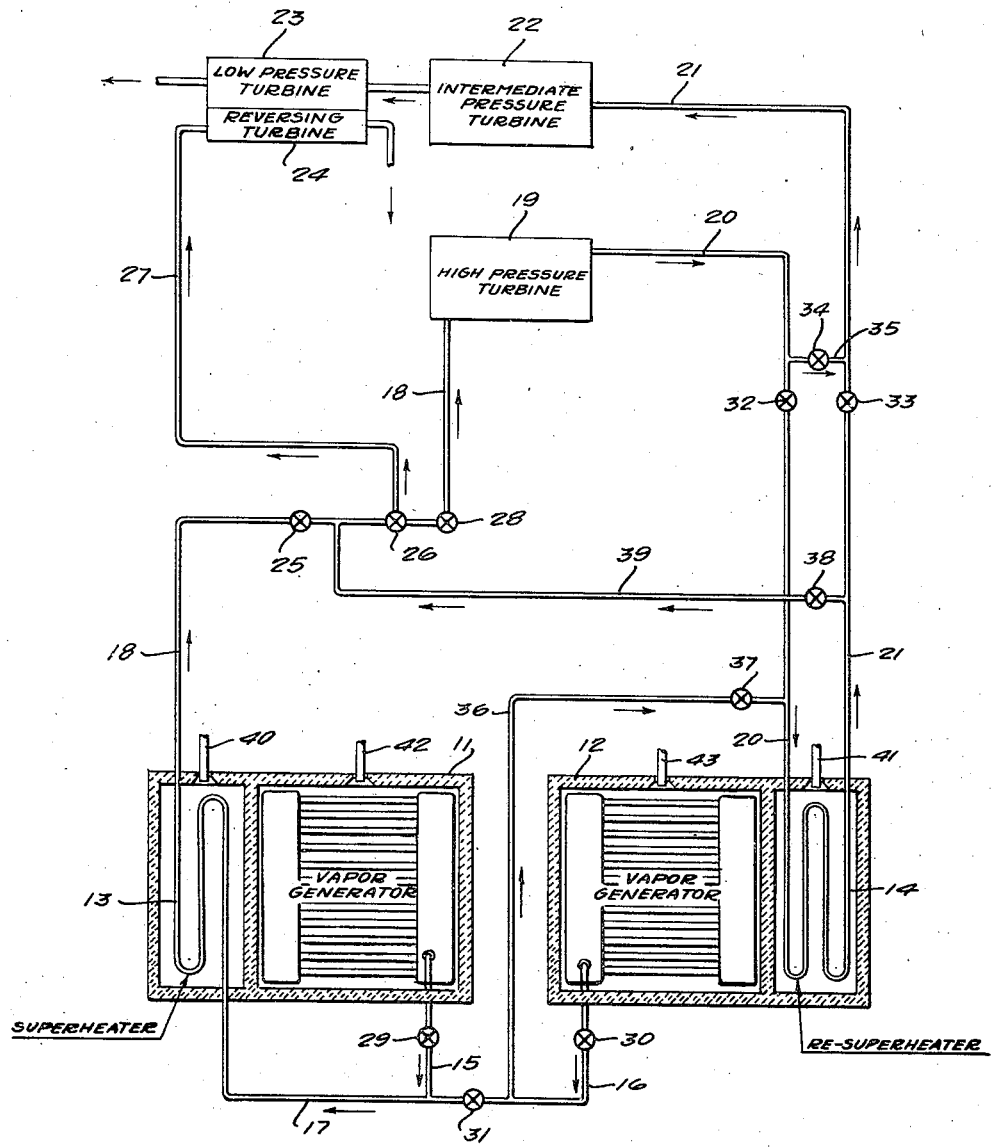

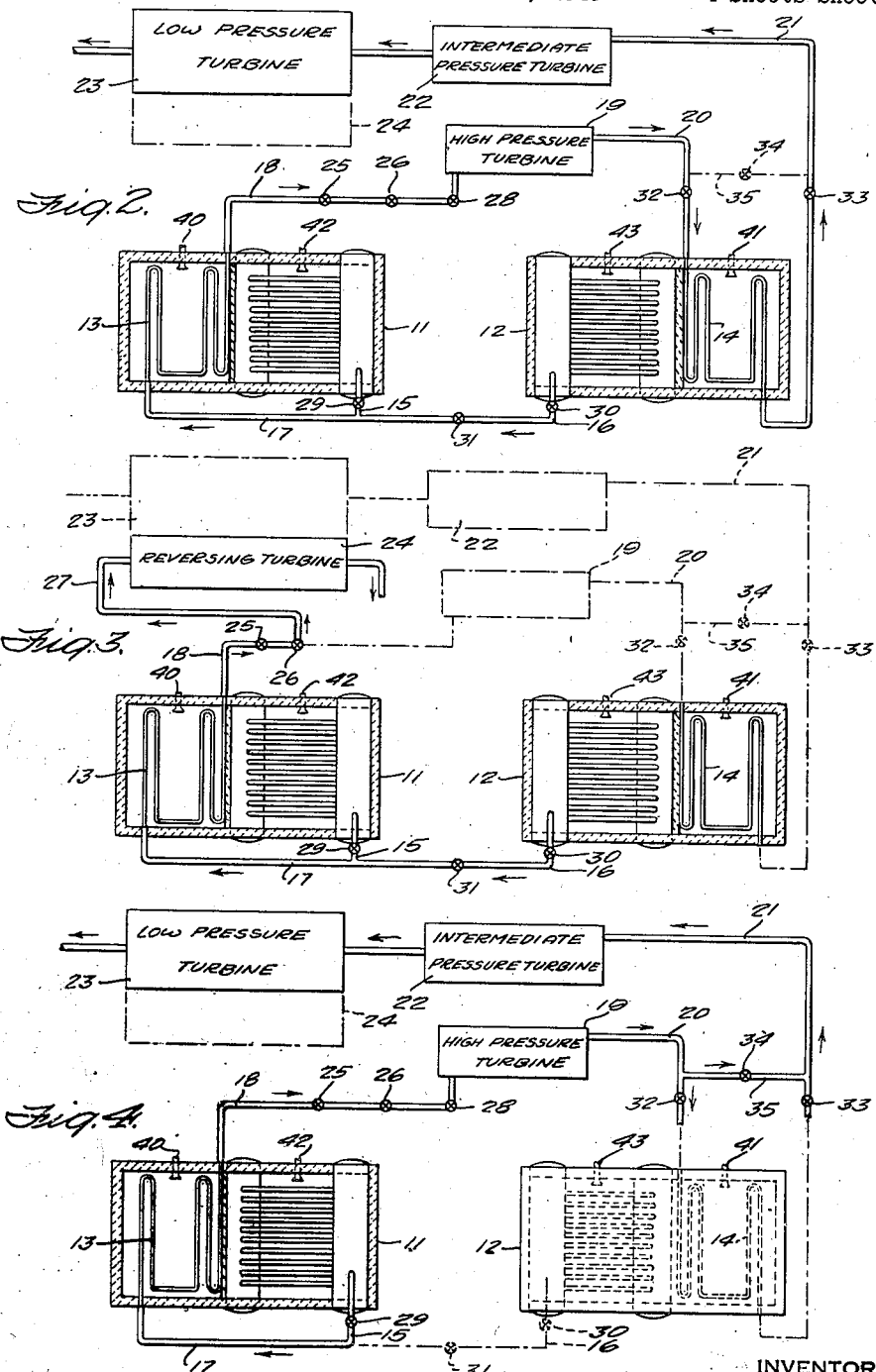

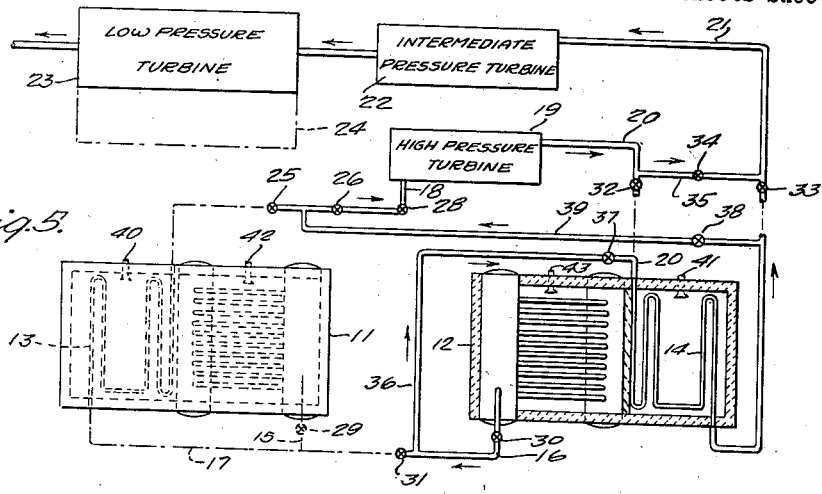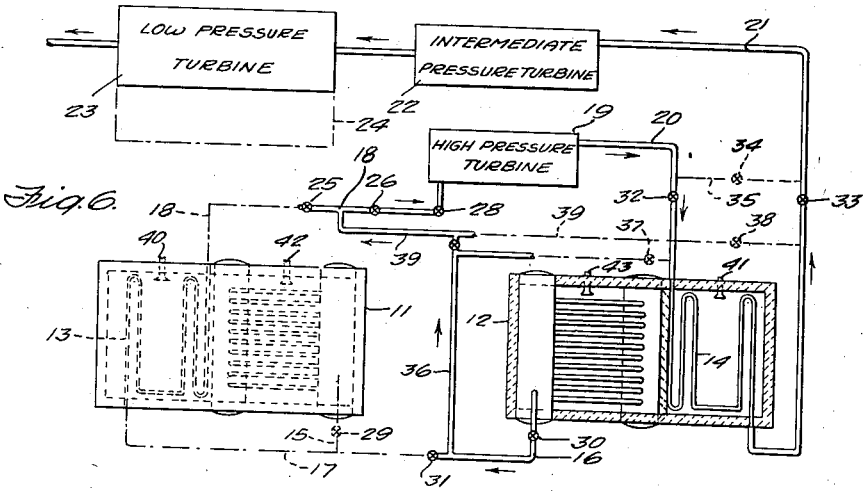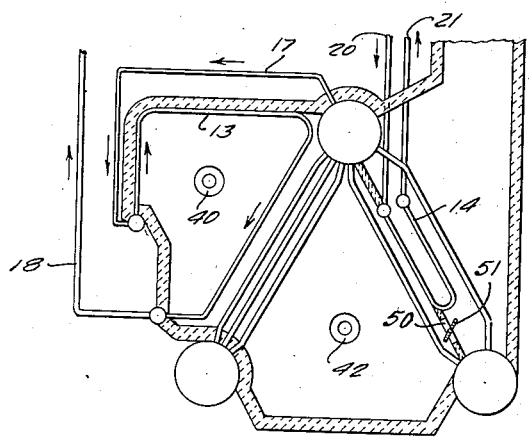

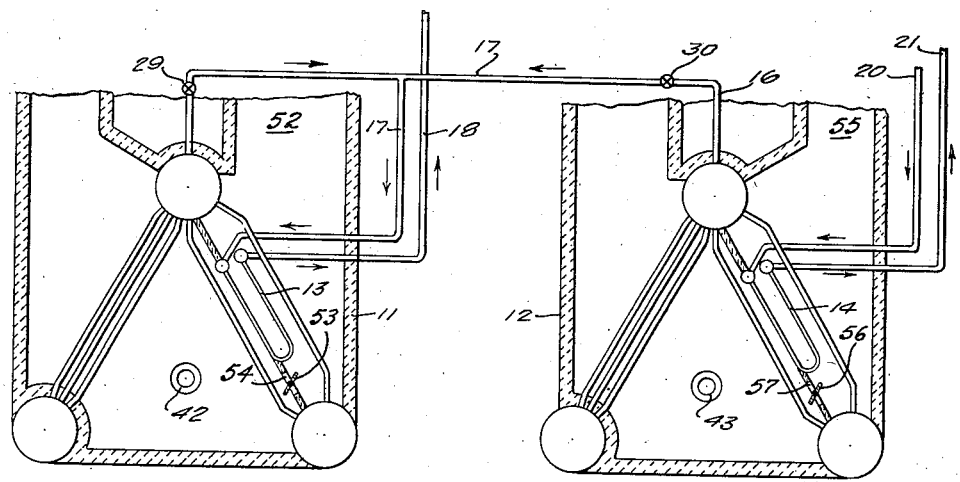
Fig. 8.
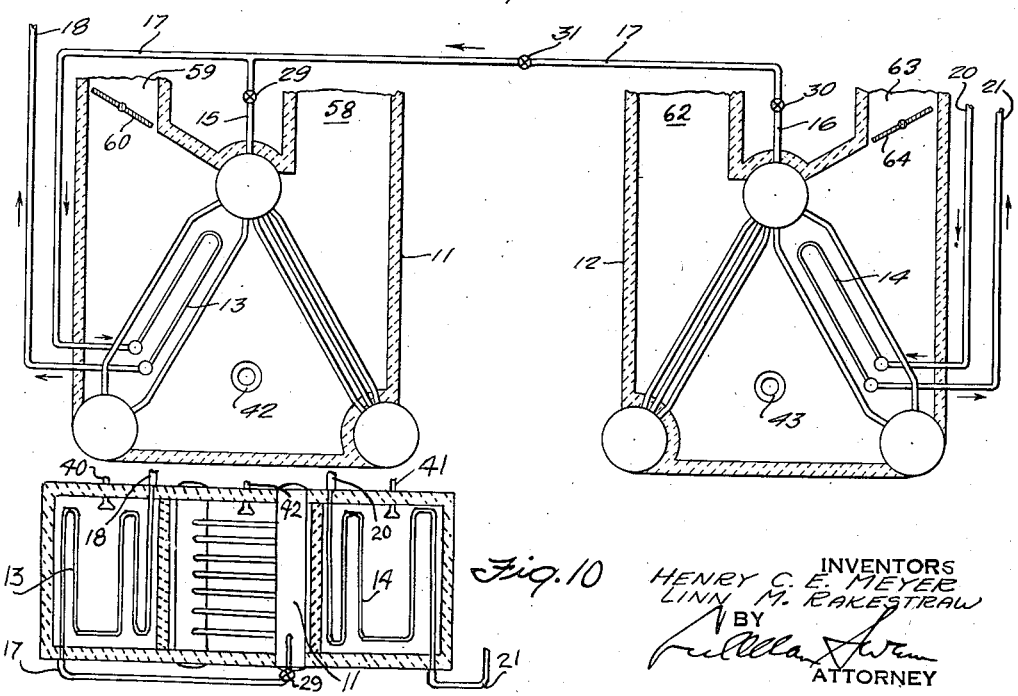
Fig. 9.
Fig. 10.
INVENTORS
HENRY C. E. MEYER
LINN M. RAKESTRAW
BY
ATTORNEY Patented Apr. 11, 1944

2,346,179

UNITED STATES PATENT OFFICE 2,346,179

POWER PLANT

Henry C. E. Meyer, Maplewood, N. J., and Linn M. Rakestraw, Little Neck, N. Y.; said Rakestraw assignor to Foster Wheeler Corporation, New York, N. Y., a corporation of New York Application March 29, 1940, Serial No. 326,599

9 Claims. (Cl. 60—73)

This invention relates to power plants and to methods of operating the same, and more particularly pertains to vapor generating plants, especially steam generating plants having steam superheaters and steam reheaters.

The invention provides a vapor power plant of the type indicated, having means for controlling satisfactorily the temperature of the vapor produced thereby, more particularly, means for the control of both the superheat temperature and the re-superheat temperature.

The invention will be understood from the following description when considered in connection with the accompanying drawings forming a part thereof, and in which:

Fig. 1 shows diagrammatically one embodiment of the invention;

Figs. 2 to 6, inclusive, are diagrammatic views illustrating various hook-ups of the embodiment of the invention shown in Fig. 1, and Figs. 7 to 10, inclusive, diagrammatically show other forms of apparatus embodying the invention.

It will be understood that the invention may be embodied in forms of apparatus other than those selected for illustration without departing from the principles of the invention.

Like characters of reference refer to the same or to similar parts throughout the several views.

Referring to Figs. 1 to 6 of the drawings, two separate steam generating units 11 and 12 are employed, each having a separately fired superheater. These generating units may be of the form shown in Blizard Patent No. 2,123,860, granted July 12, 1938, or of any other suitable superheat control type of steam generator. Assuming that these units 11 and 12 are of the type disclosed in the aforesaid Blizard patent, unit 11 will have a superheater 13 separately fired by one or more burners 40, and unit 12 will have a superheater 14 separately fired by one or more burners 41, the superheater 14, in accordance with the present invention, functioning normally as a re-superheater or as a reheater. The steam generating section of unit 11 is separately fired by one or more burners 42 and unit 12 is separately fired by one or more burners 43. The gases produced in firing the superheater in each unit of this type of generator will flow in heat exchange relationship with the steam generating surface of that unit.

The flow of steam is so arranged in the power plant illustrated in Figs. 1 and 2, that all the steam generated in both units passes first through one of the superheaters, thence to the turbine, and after expansion to a suitable pressure in the turbine, to the re-superheater in the other unit. To this end, lines 15 and 16 conduct the saturated steam from both units to a steam main 17 which conducts the steam to the superheater 13. Thereafter the superheated steam at the desired temperature is conducted through line 18, isolating valve 25 and throttle valve 26 which controls the flow of steam, to high pressure turbine 19 wherein it expands to a suitable pressure, and the exhaust steam is delivered through line 20 to the re-superheater 14 in unit 12 where it is reheated to the desired temperature. The reheated steam is then conducted through line 21 to the intermediate pressure turbine 22, and the steam exhausted from turbine 22 is delivered to low pressure turbine 23. It will be understood, of course, that the intermediate and low pressure turbines may be combined, if desired. With this arrangement, the temperature of the superheated steam and the temperature of the reheated steam may be controlled separately and at will. Also the quantity of saturated steam produced by either or both of the units 11 and 12 may be controlled as desired to provide for variations in load on the units.

If desired, saturated steam may be delivered to the turbine and the exhaust steam may be reheated in the other unit. For example, if the superheater 13 is not fired, saturated steam from one or both boilers will be conducted to the turbine 19 and the exhaust steam will be reheated in reheater 14.

The arrangement shown also permits operating the reversing turbine 24 at a lower temperature than the high pressure turbine. In reversing, as shown in Fig. 3, steam from both units 11 and 12 is conducted to the superheater 13, as in the normal operation of the plant as previously described, and after being superheated to the extent desired, is conducted through line 18, through an isolating valve 25 and throttle valve 26 which controls the reversing turbine, and thence through line 27 to the reversing turbine. During this operation, the superheater 13 is fired at a lower intensity to provide a lower degree of superheat for the steam delivered to the reversing turbine, and the re-superheater 14 is not fired at all because no steam flows therethrough since the reversing turbine exhausts to condensing equipment or to the atmosphere.

The plant shown is also arranged so that in the event of an emergency which necessitates the shut down of either unit, the other unit can be used with its superheater and the plant operated without reheating, or with reheating only. For example, as illustrated in Fig. 4, if unit 12 fails, valves 30, 31, 32 and 33 are closed, and valve 34 is opened. Steam from unit 11 will then flow through the superheater 13, valves 25, 26 and 28 and through line 18 to the high pressure turbine 19, and the steam exhausted from the turbine 19 will flow through lines 20 and 35, through valve 34 and line 21 to the intermediate pressure turbine 22 without reheating. If unit 11 fails, the hook-up shown in Fig. 5 is used, valves 25, 29, 31, 32 and 33 are closed, and the steam will flow from unit 12 through valve 30, lines 16 and 36, through valve 37, and line 20 to the superheater 14 where it is heated to the desired temperature, thence through line 21, valve 38, line 39, line 18, valves 26 and 28 to the high pressure turbine 19. The steam exhausted from the turbine 19 flows through lines 20 and 35, valve 34, and line 21 to the intermediate pressure turbine 22 without reheating. If desired, it will be understood that valve connections can be arranged, for example as shown in Fig. 6, so that under emergency conditions, saturated steam will flow from the unit in operation directly to the high pressure turbine without superheating, after which it will be passed through the superheater of the unit in operation which would then function as an inter-stage superheater, before it is passed to the intermediate pressure turbine.

It will be understood that during normal operation, that is to say, during operation when the steam generated in both units flows to the superheater 13, as shown in Figs. 1 and 2, and thence to the high pressure turbine, and the exhaust steam is reheated in re-superheater 14 after which it flows to the intermediate and low pressure turbines, the valves 29, 30, 31, 25, 26, 28, 32 and 33 will be open, and valves 34, 37 and 38 will be closed. In reversing, as shown in Fig. 3, valves 29, 30, 31, 25 and 26 will be open, and all the other valves will be closed.

Other forms of apparatus embodying the invention may be utilized. For example, as shown in Fig. 7, in lieu of two steam generating units of the type disclosed in the aforesaid Blizard Patent No. 2,123,860, a single unit of this general type may be used with a re-superheater 14 located in, or adjacent, the bank of steam generating units which is near the gas outlet of the unit and over which the gases normally flow to the outlet. A damper controlled gas by-pass 50 having a damper 51 therein by means of which the amount of gases passing over the re-superheater may be controlled is disposed below the re-superheater. With this arrangement, the saturated steam will flow through the steam main 17 to the superheater 13 where it will be heated to the desired temperature by the separate firing of the superheater by the burner 40. The superheated steam is passed through the line 18 to the high pressure turbine 19 through a hook-up similar to that shown in Fig. 1. After the superheated steam has expanded in the high pressure turbine, it is conducted to the re-superheater 14 through the line 20 where it is reheated to the extent desired by control of the burners 42 which fire the steam generating section of the unit, or by control of the gas by-pass 50 around the re-superheater by operation of the damper 51, or both. The resuperheated steam is discharged from the resuperheater 14 through the line 21. In this arrangement, the gases from the burner 40 in the superheater furnace flow into the boiler furnace and thence with the gases from the burner 42 in the boiler furnace flow over the other bank of steam generating tubes and over the re-superheater 14, or through the controlled by-pass, or both.

Another form of apparatus which may be utilized, as shown in Fig. 8, comprises two so-called "A" type steam generating units. As shown, an "A" type steam generating unit 11 has a superheater 13 disposed in one of the tube banks thereof in the path of flow of gases from the burner 42 in the steam generating furnace to a flue 52. The flow of gases from the burner 42 over the superheater 13 and into the flue 52 is controlled by a damper 53 in a by-pass 54 beneath the superheater. The upper drum of the unit 11 is connected to the upper drum of another "A" type steam generating unit 12 by a main steam line 17 and a line 16. Line 17 is controlled adjacent the upper drum of the unit 11 by a valve 29 and adjacent the line 16 by the valve 30. The superheater 13 of the unit 11 receives steam to be superheated through the line 17 and discharges superheated steam through the line 18 to a high pressure turbine 19 through a hook-up similar to that shown in Fig. 1. The steam generating unit 12 is similar to the unit 11 and has a re-superheater 14 positioned in one of the tube banks thereof in the path of flow of gases from the burner 43 in the steam generating furnace to a flue 55. The flow of gases from the burner 43 over the re-superheater 14 and into the flue 55 is controlled by a damper 56 in a by-pass 57 beneath the re-superheater. The expanded steam from the high pressure turbine 19 passes into the re-superheater through the line 20 and after re-superheating is passed through the line 21 in a hook-up such as shown in Fig. 1 to the intermediate pressure turbine 22 also shown in Fig. 1. With this arrangement, steam from both units will flow to the superheater and will be heated to the desired degree of superheat by control of the firing of the furnace, or by control of the superheater by-pass 54, or both. The expanded steam exhausted from the high pressure turbine will be conducted to the re-superheater through the line 20 and the degree to which it is reheated will be controlled by regulation of the firing of the furnace, or by control of the gas by-pass 57 around the reheater, or both.

In Fig. 9 is shown another arrangement which comprises two "A" type steam generating units similar to those shown in Fig. 8. The steam generating unit 11 has an upper drum and two spaced lower drums each connected to the upper drum by a vertically inclined bank of steam generating tubes. The steam generating furnace which is fired by a burner 42 is positioned between the tube banks, the gases of combustion passing over both tube banks to gas outlets 58 and 59, one disposed above each tube bank. One of the tube banks has the superheater 13 positioned therein which superheater receives saturated steam from the unit 12 through the line 16 controlled by the valve 30, and line 17 controlled by the valve 29 and also from the unit 11 through the line 15 connected to the line 17 and controlled by the valve 29. Superheated steam is passed to the high pressure turbine 19 through the line 18 as shown in Fig. 1. The gas outlet 59 above the tube bank in which the superheater 13 is disposed is controlled by a damper 60 so that the flow of gases over the superheater may be controlled. The unit 12 is similar in construction to the unit 11, the steam generating furnace being fired by a burner 43 from which the gases pass over both tube banks to gas outlets 62 and 63 positioned above each bank respectively. A re-superheater 14 is positioned in one of the tube banks and the outlet 63 above said bank is controlled by a damper 64 so that the amount of gases flowing over the re-superheater may be controlled. The re-superheater 14 receives expanded steam from the high pressure turbine 19 not shown in this view, through the line 20 which steam after re-superheating is passed through the line 21 to an intermediate pressure turbine as shown in Fig. 1. Steam from both units 11 and 12 will be conducted to the superheater 13 wherein the temperature will be controlled by regulation of the rate of firing of the burner 42 in the furnace of the unit 11, or by regulation of the damper 60 controlling the gas outlet 59 above the superheater, or both. The steam exhausted from the high pressure turbine will be reheated in the re-superheater 14 and the degree to which it is reheated will be determined by the firing rate of the burner 43 in the furnace of the unit 12, or the regulation of the damper 64 controlling the gas outlet 63 above the re-superheater, or both.

Also, one or more steam generating units may be employed with a separately fired superheater and a separately fired resuperheater, as illustrated in Fig. 10, in which the gases from the superheater and the re-superheater do not flow over the steam generating surface. As shown, the steam generating unit 11 is disposed within a setting and is separately fired by a burner 42. The unit 11 is similar in construction to the steam generating unit 11 in the form of the invention shown in Fig. 1. Positioned in the setting at one side of the unit 11 and separated from said unit by a refractory wall is a superheater furnace separately fired by a burner 40 having positioned therein a superheater 13. The superheater receives saturated steam from the unit 11 through a line 17 controlled by a valve 29. The steam after superheating, as in the form of the invention shown in Fig. 1, is passed to a high pressure turbine through the line 18. Disposed in the setting and on the opposite side of the unit 11 and separated therefrom by a refractory wall is a re-superheater furnace separately fired by a burner 41 and having a re-superheater 14 positioned therein. The re-superheater, as in the other forms of the invention hereinbefore described, receives expanded steam from the high pressure turbine through the line 20 which steam after resuperheating is passed to the intermediate pressure turbine through the line 21. With such an arrangement, the superheat temperature will be controlled by control of the firing of the superheater, and the same will be true of the re-superheater. Such an arrangement could be in one or a number of settings.

From the foregoing, it will be perceived that three separate means of control are provided in a steam generating power plant whereby the quantity of steam generated may be varied in response to any load conditions, the temperature of superheat of the steam may be varied at will, and the temperature of reheat may be varied at will.

Inasmuch as the form, location and relative arrangement of the several parts of the several forms of apparatus disclosed herein, and the sequence of the several steps of the method disclosed, may be varied without departing from the principles of the invention, it will be understood that there is no intention to limit the invention excepting by the scope of the appended claims.

What is claimed is:

1. A vapor generating power plant comprising two vapor generators, a superheater associated with one generator, a re-superheater associated with the other generator, a vapor consumer, means for conducting vapor evolved in both generators to the superheater, means for controlling the degree to which the vapor is superheated in the superheater, means for conducting the superheated vapor to the vapor consumer, means for conducting the vapor exhausted from the consumer to the re-superheater, means for controlling the degree to which the vapor is reheated in the re-superheater, another vapor consumer, means for conducting the reheated vapor to the other vapor consumer, means for cutting out of operation the generator having the superheater, means for conducting the vapor evolved in the other generator to the re-superheater wherein the vapor will be superheated, means for conducting the superheated vapor to the vapor consumer, and means for by-passing the vapor exhausted from the consumer around the re-superheater to the other vapor consumer.

2. A power plant comprising a plurality of vapor generating sections, means for firing each section, a plurality of superheaters, means for controlling the degree to which the vapor is superheated in each superheater, conduits for conducting vapor from a plurality of vapor generating sections to one superheater, a high pressure vapor consumer, a superheated vapor conduit for conducting vapor from said one superheater to said consumer, valve means for controlling the flow of vapor to said one superheater, an exhaust conduit for conducting vapor exhausted from said consumer to another superheater, a lower pressure vapor consumer, another superheated vapor conduit for conducting vapor from said other superheater to said lower pressure vapor consumer, a by-pass conduit connecting the exhaust and said other superheated vapor conduits, a valve in said by-pass conduit for controlling the by-pass conduit to by-pass the vapor exhausted from the high pressure consumer around said other superheater, a connecting conduit connecting said first mentioned conduits with said exhaust conduit, a valve in said connecting conduit, another connecting conduit connecting said other superheated vapor conduit with said superheated vapor conduit, a valve in said other connecting conduit, and a valve for controlling each of said exhaust and other superheated vapor conduits positioned between the point of connection of said by-pass conduit and said other superheater, the arrangement being such that the valves in the conduits may be operated to cut out of operation at least one of the superheaters and superheated vapor from another superheater will be passed to the high pressure vapor consumer.

3. A vapor generating power plant comprising a plurality of vapor generators, means for firing each generator, a superheater associated with one generator, means for firing the superheater to control the degree to which the vapor is superheated substantially independently of the vapor generator, a re-superheater associated with another generator, means for firing the re-superheater to control the degree to which the vapor is resuperheated independently of the vapor generation and vapor superheat, a vapor consumer, means for conducting vapor evolved in both generators to the superheater, means for conducting the superheated vapor to the vapor consumer, valve means for controlling the flow of vapor to the superheater, means for conducting the vapor exhausted from the consumer to the re-superheater, another vapor consumer, means for conducting the reheated vapor to the other vapor consumer, means for cutting out of operation the generator having the superheater, means for conducting the vapor evolved in the other generator to the re-superheater wherein the vapor will be superheated, means for conducting the superheated vapor to the vapor consumer, and means for by-passing the vapor exhausted from the consumer around the re-superheater.

4. A vapor generating power plant comprising vapor generating means, at least two superheaters, means for controlling the degree to which the vapor is superheated in the superheaters, conduit means for conducting the vapor evolved in the vapor generating means to one superheater, a high pressure vapor consumer, a superheated vapor conduit for conducting the vapor superheated in said one superheater to the vapor consumer, means for conducting the vapor exhausted from the consumer to another superheater, another vapor consumer, means for conducting the vapor superheated in the other superheater to the other vapor consumer, means for cutting said one superheater out of operation, means for conducting the vapor evolved in the vapor generating means to the other superheater wherein the vapor will be superheated, means for conducting the vapor superheated in the other superheater to the high pressure vapor consumer, and means for by-passing the vapor exhausted from the high pressure vapor consumer around the other superheater and to the other vapor consumer.

5. A vapor generating power plant comprising vapor generating means, at least two superheater, means for controlling the degree to which the vapor is superheated in the superheaters, conduit means for conducting the vapor evolved in the vapor generating means to one superheater, a high pressure vapor consumer, a superheated vapor conduit for conducting the vapor superheated in said one superheater to the vapor consumer, valve means for controlling the flow through the superheated vapor conduit of superheated vapor from said one superheater to the vapor consumer, a second conduit for conducting vapor evolved in the vapor generating means to another superheater, valve means for controlling the flow of vapor from the vapor generating means to the other superheater, another superheated vapor conduit for conducting vapor superheated in the other superheater to the high pressure vapor consumer, valve means for controlling the flow of superheated vapor through the other superheated vapor conduit to the high pressure vapor consumer, an exhaust conduit for conducting vapor exhausted from said consumer to the other superheater, a lower pressure vapor consumer, another superheated vapor conduit for conducting vapor from said other superheater to the lower pressure vapor consumer, a by-pass conduit connecting the exhaust conduit and said other superheated vapor conduit, a valve in said by-pass conduit for controlling the flow of vapor through said conduit to by-pass vapor exhausted from the high pressure consumer around the other superheater, a connecting conduit connecting the other superheated vapor conduit and the superheated vapor conduit, valve means for controlling the flow of vapor through the connecting conduit, and valve means for controlling the flow of vapor through each of said exhaust and other superheated vapor conduits at a point therein between the by-pass conduit and the other superheater.

6. A vapor generating power plant comprising vapor generating means, means for firing said vapor generating means, at least two superheaters, means for separately firing each of the superheaters to control the degree to which the vapor is superheated substantially independently of the vapor generator, conduit means for conducting the vapor evolved in the vapor generating means to one superheater, a high pressure vapor consumer, a superheated vapor conduit for conducting the vapor superheated in said one superheater to the vapor consumer, means for conducting the vapor exhausted from the consumer to another superheater, another vapor consumer, means for conducting the vapor superheated in the other superheater to the other vapor consumer, means for cutting said one superheater out of operation, means for conducting the vapor evolved in the vapor generating means to the other superheater wherein the vapor will be superheated, means for conducting the vapor superheated in the other superheater to the high pressure vapor consumer, and means for by-passing the vapor exhausted from the high pressure vapor consumer around the other superheater and to the other vapor consumer.

7. A vapor generating power plant comprising vapor generating means, means for firing said vapor generating means, a superheater associated with the vapor generating means, control means for controlling the degree to which the vapor is superheated in said superheater, a superheater fired independently of the vapor generator, conduit means for conducting the vapor evolved in the vapor generating means to one superheater, a high pressure vapor consumer, a superheated vapor conduit for conducting the vapor superheated in said one superheater to the vapor consumer, means for conducting the vapor exhausted from the consumer to another superheater, another vapor consumer, means for conducting the vapor superheated in the other superheater to the other vapor consumer, means for cutting the superheater out of operation, means for conducting the vapor evolved in the vapor generating means to the other superheater wherein the vapor will be superheated, means for conducting the vapor superheated in the other superheater to the high pressure vapor consumer, and means for by-passing the vapor exhausted from the high pressure vapor consumer around the other superheater and to the other vapor consumer.

8. A power plant comprising a plurality of vapor generating sections, means for firing each section, a plurality of superheaters, means for firing each superheater independently of the firing of the vapor generating sections and the other superheaters, conduits for conducting vapor from a plurality of vapor generating sections to one superheater, a high pressure vapor consumer, a superheated vapor conduit for conducting vapor from said one superheater to said consumer, valve means for controlling the flow of vapor to said one superheater, an exhaust conduit for conducting vapor exhausted from said consumer to another superheater, a lower pressure vapor consumer, another superheated vapor conduit for conducting vapor from said other superheater to said lower pressure vapor consumer, a by-pass conduit connecting the exhaust and said other superheated vapor conduits, a valve in said by-pass conduit for controlling the by-pass conduit to by-pass the vapor exhausted from the high pressure consumer around said other superheater, a connecting conduit connecting said first-mentioned conduits with said exhaust conduit, a valve in said connecting conduit, another connecting conduit connecting said other superheated vapor conduit with said superheated vapor conduit, a valve in said other connecting conduit, and a valve for controlling each of said exhaust and other superheated vapor conduits, positioned between the point of connection of said by-pass conduit and said other superheater, the arrangement being such that the valves in the conduits may be operated to cut out of operation at least one of the superheaters and superheated vapor from another superheater will be passed to the high pressure vapor consumer.

9. A vapor generating power plant comprising a plurality of vapor generating sections, means for firing each section, at least two superheaters, means for controlling the degree to which the vapor is superheated in the superheaters, conduits for conducting the vapor evolved in the vapor generators to one superheater, valve means for separately controlling the flow of vapor from each vapor generating section to said superheater, a high pressure vapor consumer, a superheated vapor conduit for conducting the vapor superheated in said one superheater to the vapor consumer, valve means for controlling the flow through the superheated vapor conduit of superheated vapor from said one superheater to the vapor consumer, an exhaust conduit for conducting vapor exhausted from said consumer to the other superheater, a lower pressure vapor consumer, another superheated vapor conduit for conducting vapor from said other superheater to the lower pressure vapor consumer, a by-pass conduit connecting the exhaust conduit and said other superheated vapor conduit, a valve in said by-pass conduit for controlling said conduit to by-pass the vapor exhausted from the high pressure consumer around the other superheater, a connecting conduit connecting the first mentioned conduits with said exhaust conduit, valve means for controlling the flow of vapor through the connecting conduit, another connecting conduit connecting the other superheated vapor conduit and the superheated vapor conduit, valve means for controlling the flow of vapor through the other connecting conduit, and valve means for controlling the flow of vapor through each of said exhaust and other superheated vapor conduits at a point therein between the by-pass conduit and the other superheater.

HENRY C. E. MEYER.
LINN M. RAKESTRAW.